(12) United States Patent
Ma et al.

(10) Patent No.: US 12,288,150 B2
(45) Date of Patent: Apr. 29, 2025

(54) COMPUTERIZED SYSTEM AND METHOD FOR DISTILLED DEEP PREDICTION FOR PERSONALIZED STREAM RANKING

(71) Applicant: YAHOO ASSETS LLC, New York, NY (US)

(72) Inventors: Yufeng Ma, San Jose, CA (US); Rao Shen, Sunnyvale, CA (US); Yu Wang, Sunnyvale, CA (US); Donghyun Kim, San Francisco, CA (US); Liuqing Li, Blacksburg, VA (US); Kostas Tsioutsiouliklis, Saratoga, CA (US)

(73) Assignee: YAHOO ASSETS LLC, New York, NY (US)

( * ) Notice: Subject to any disclaimer, the term of this patent is extended or adjusted under 35 U.S.C. 154(b) by 890 days.

(21) Appl. No.: 17/236,450

(22) Filed: Apr. 21, 2021

(65) Prior Publication Data
US 2022/0358347 A1 Nov. 10, 2022

(51) Int. Cl.
*G06N 3/045* (2023.01)
*G06F 17/18* (2006.01)
*G06N 3/08* (2023.01)

(52) U.S. Cl.
CPC ............ *G06N 3/045* (2023.01); *G06F 17/18* (2013.01); *G06N 3/08* (2013.01)

(58) Field of Classification Search
CPC ........... G06N 3/045; G06N 3/08; G06F 17/18
See application file for complete search history.

(56) References Cited

U.S. PATENT DOCUMENTS

| | | | |
|---|---|---|---|
| 2021/0073596 A1* | 3/2021 | Bezzubtseva | G06N 7/01 |
| 2021/0326401 A1* | 10/2021 | Chng | G06F 16/9536 |
| 2022/0198300 A1* | 6/2022 | Wang | G06F 16/335 |

(Continued)

OTHER PUBLICATIONS

Wang, Ruoxi, et al. "Deep & cross network for ad click predictions." Proceedings of the ADKDD'17. 2017. 1-7. (Year: 2017).*

(Continued)

*Primary Examiner* — James T Tsai
(74) *Attorney, Agent, or Firm* — James J. DeCarlo; Greenberg Traurig, LLP

(57) ABSTRACT

The disclosed systems and methods provide a novel framework that provides mechanisms for a Deep & Cross Network (DCN) framework that performs distilled deep prediction for personalized stream ranking on portal websites. The disclosed framework is scalable to satisfy the much more stringent latency and computational requirements required by current network operating environments. The disclosed framework is able to dynamically evaluate and leverage live traffic on network sites in order to provide, update and maintain current recommendations for users as they traverse to a portal and when they navigate within the portal. The disclosed framework implements a DCN model(s) that is capable of being compressed into a model size for a unified optimization within a live traffic environment by combining knowledge distillation and model compression techniques. The disclosed framework is built as a light-weight deep learning model that can be served in production and perform on par with large models.

20 Claims, 8 Drawing Sheets

(56) References Cited

U.S. PATENT DOCUMENTS

2022/0335303 A1* 10/2022 Haidar .................. G06N 3/096
2022/0358347 A1* 11/2022 Ma ........................ G06Q 50/01

OTHER PUBLICATIONS

Yu Cheng and Duo Wang and Pan Zhou and Tao Zhang, "A Survey of Model Compression and Acceleration for Deep Neural Network" version 8, available at https://arxiv.org/abs/1710.09282v8 (Year: 2017).*

HofstÃ¤tter et al.. "Improving Efficient Neural Ranking Models with Cross-Architecture Knowledge Distillation," Jan. 22, 2021, URL=https://arxiv.org/abs/2010.02666 (Year: 2021).*

\* cited by examiner

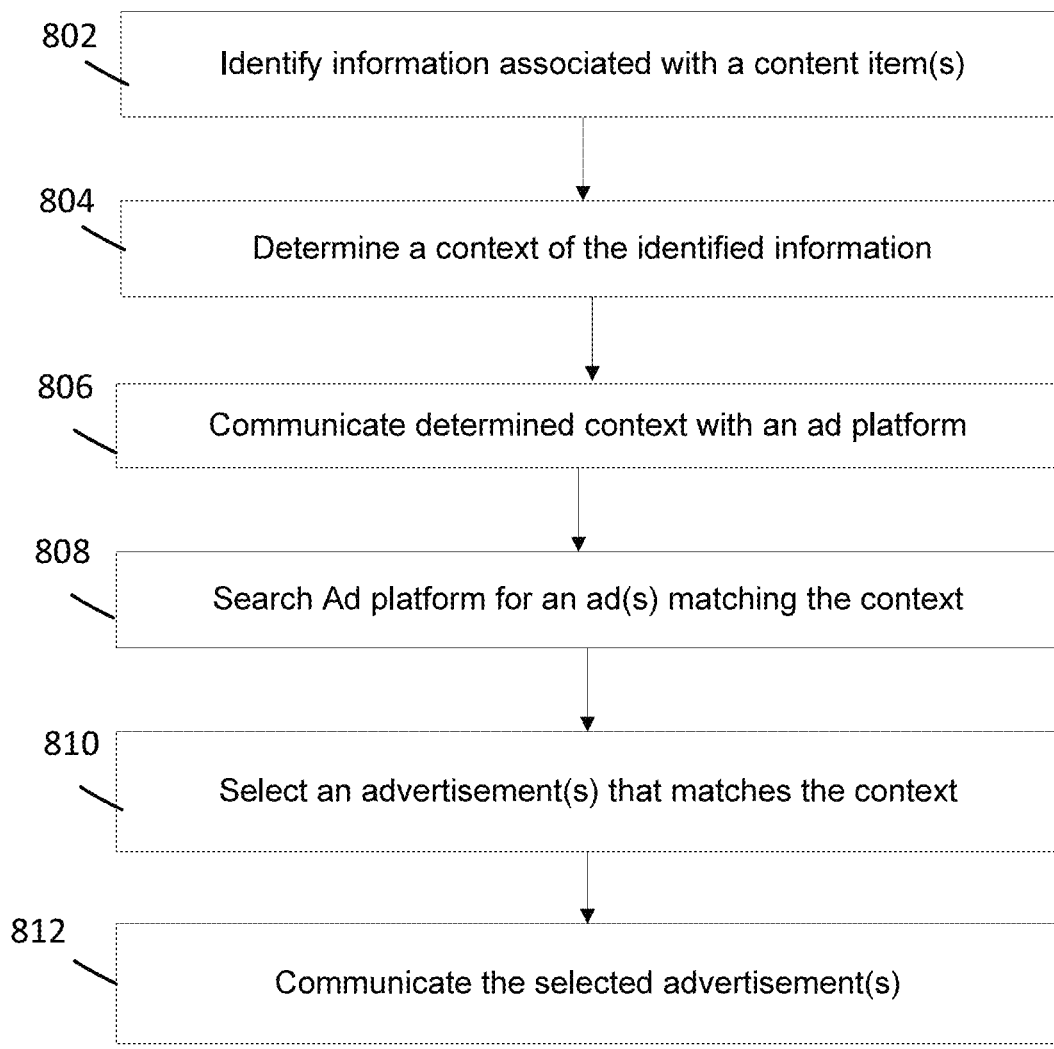

COMPUTERIZED SYSTEM AND METHOD FOR DISTILLED DEEP PREDICTION FOR PERSONALIZED STREAM RANKING

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network-based computerized content hosting and providing devices, systems and/or platforms by modifying the capabilities and providing non-native functionality to such devices, systems and/or platforms through an improved framework for generating and providing interactive content recommendations.

BACKGROUND

Many portal websites recommend content items to visiting users. For example, new articles, images, videos, and the like can be displayed on portal pages for visiting users to interact with. Current recommendation systems deployed by portals operate by ranking content items based on how well they match users' interests. This is the mechanism current systems rely on for retaining portal sessions, as well as driving new traffic to their sites.

SUMMARY

This disclosure provides a novel Deep & Cross Network (DCN) framework that alleviates shortcomings in the art, and provides novel mechanisms for performing distilled deep prediction to personalize stream ranking on portal websites. As discussed herein, the disclosed framework is scalable to satisfy the much more stringent latency and computational requirements required by current network operating environments. Rather than simply performing offline evaluations of ranked and recommended content to user data, the disclosed framework is able to dynamically evaluate and leverage live traffic on network sites in order to provide, update and maintain current recommendations for users as they navigate to and traverse a portal.

Currently, some conventional systems utilize Gradient Boosted Decision Tree (GBDT)—based ranking models. GBDT-based ranking models (or GBDT models) take into account the interests of different users on each news article. GBDT models utilize non-click feedback features such as user age, document length, and contextual features, as well as click feedback from a Near Real Time (NRT) data pipeline. However, GBDT models are restrictive, in that their expressive power consumption and low-performance efficiency renders them incapable of being deployed in live, or real-time environments, as they are unscalable to increasing feature spaces. Therefore, accuracy, efficiency and overall system performance decline as size and dimensionality increases, which renders these systems lacking in applicability to current network conditions.

Varieties of deep neural network architectures have recently been proposed to capture complicated feature interactions. However, given their model size, few, if any at all, can be realistically deployed in large web-scale applications where intensive computation and low latency are required.

Common neural network based approaches involve stacking multiple layers together to learn interactions, such as DeepCrossing and Wide&Deep. Wide&Deep combines learned features with hand-crafted features, while DeepCrossing relies on residual connections to better learn features. The expectations are that these multiple layers can learn useful cross features in an implicit way. However, such architectures of simply concatenating features together carries too little information as there are just linear combinations of features.

Instead of drawing representation power from deeper or wider architectures, as in conventional systems/models, the disclosed DCN framework leverages feature crossing through a cross network, which automatically learns high-order crossing features by crossing learned features with an original input feature multiple times. According to some embodiments, as discussed below, the DCN modelling is capable of being compressed into a model size for a unified optimization within a live traffic environment by combining both knowledge distillation and model compression techniques. This enables DCN's lightweight feature crossing, and ensures the framework and/or its modelling can be fit into bucket space for live traffic analysis and implementation.

Therefore, despite recent advances in deep ranking models, there are still challenges to address in order to make them more effective and deployable for personalized content recommendation in real production. Personalized recommendation is, by default, a large-scale task with stringent latency requirements since online companies need to serve millions of users and items every day. For example, Yahoo! ® Homepage receives up to 1500 requests per second for personalized content recommendation, then for each of these requests, there are hundreds of thousands of content items that need to be ranked and then selected to users considering their personal interests. Nevertheless, the whole process needs to be accomplished within around 200 ms. Therefore, deep ranking models cannot be too heavily-weighted. Although lots of recent state-of-the-art deep ranking models have attempted to evaluate and produce recommendation on similar datasets, their implementations have been offline, or in a vacuum (e.g., in academic settings), and not in real-world, digital environments. Their model size and complexity often make them too large (both size-wise and computationally) to be deployed in real production.

As a result, the disclosed systems and methods provide a framework that can be built and/or configured as a lightweight deep learning model that can be served in production and perform on par with large models.

In accordance with one or more embodiments, the present disclosure provides computerized methods for a novel framework for providing displayed, interactive content recommendations. In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework for providing displayed, interactive content recommendations.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 8 is a block diagram illustrating an exemplary data flow in accordance with some embodiments of the present disclosure.

DESCRIPTION OF EMBODIMENTS

Figure 1:
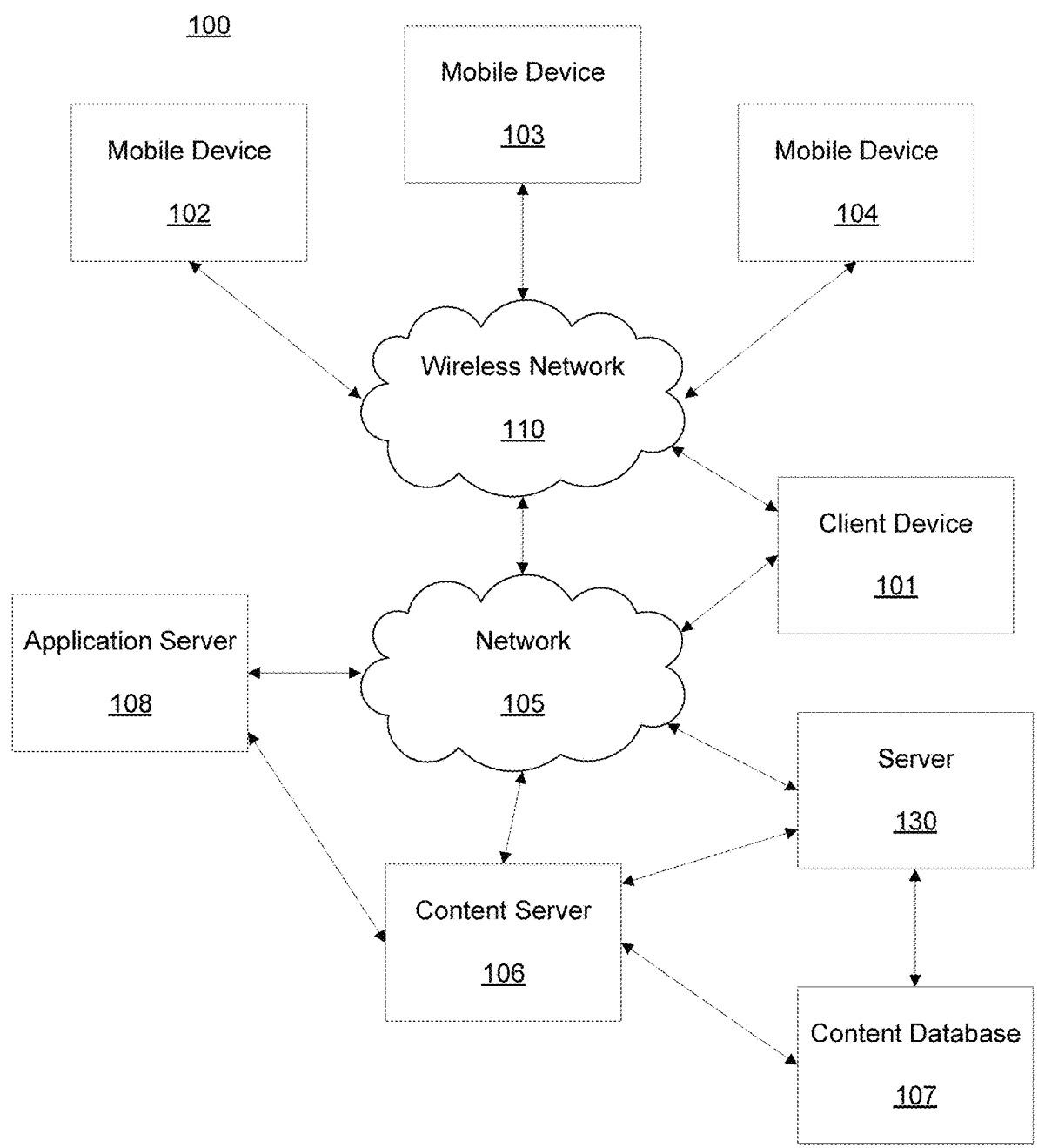
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

As discussed in more detail below at least in relation to FIG. 8, according to some embodiments, information associated with, derived from, or otherwise identified from, during or as a result of a recommendation, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, with higher quality ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below.

Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
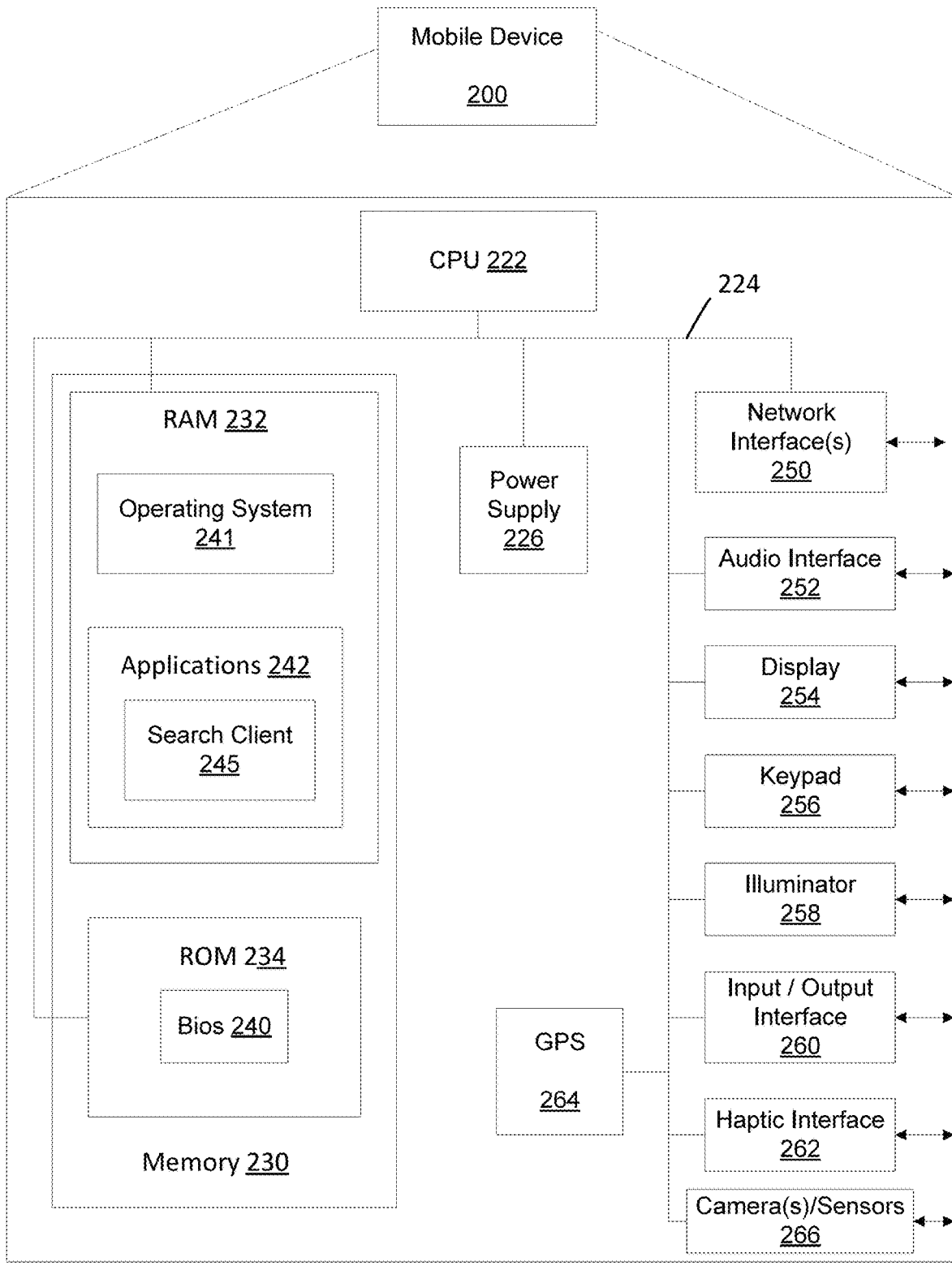
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SM, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
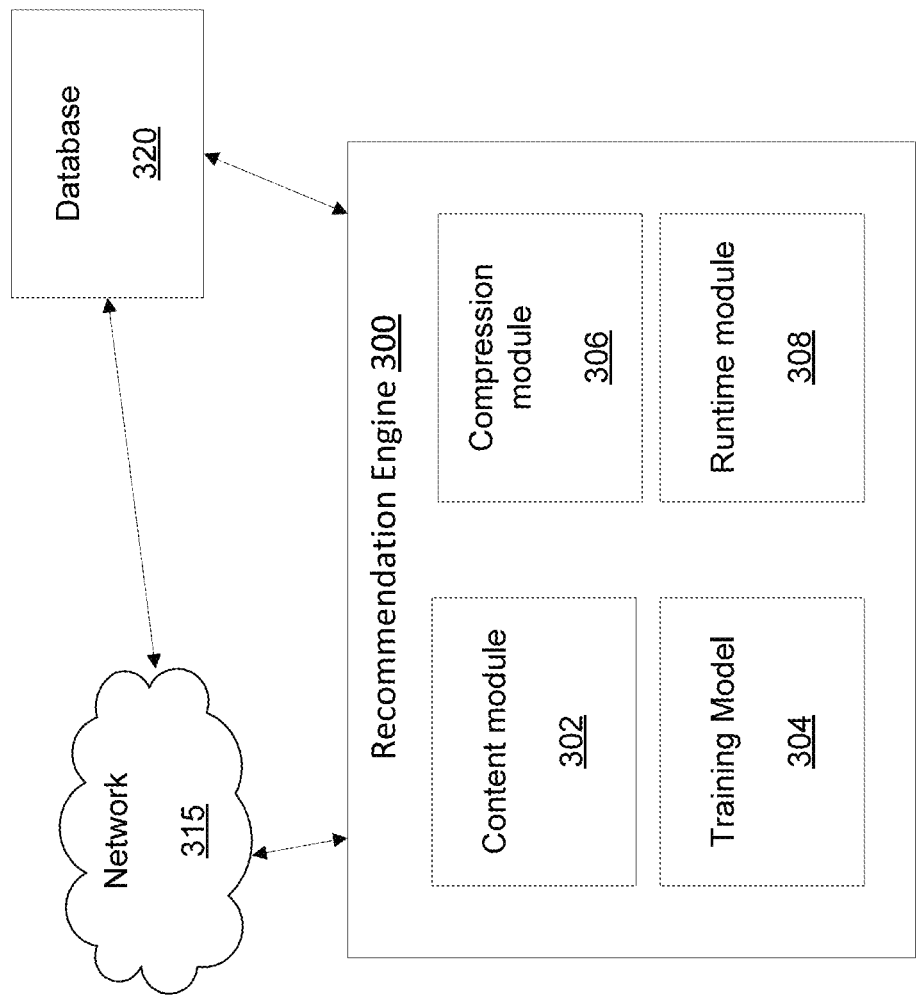
FIG. 3 is a block diagram illustrating components of an exemplary system in accordance with embodiments of the present disclosure.

FIG. 3 is a block diagram illustrating the components for performing the systems and methods discussed herein. FIG. 3 includes recommendation engine 300, network 315 and database 320. The recommendation engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, recommendation engine 300 can be embodied as a stand-alone application that executes on a networking server. In some embodiments, the recommendation engine 300 can function as an application installed on the user's device, and in some embodiments, such application can be a web-based application accessed by the user device over a network. In some embodiments, the recommendation engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is look-up table (LUT) illustrated in FIG. 4, as discussed below. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, searches, previous recommendations, messages, images, videos, text, products, items and services from an assortment of media, applications and/or service providers and/or platforms, and the like. Accordingly, any other type of known or to be known attribute or feature associated with a message, data item, media item, login, logout, website, application, communication (e.g., a message) and/or its transmission over a network, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the recommendation engine 300, and the database of stored resources 320. Indeed, as illustrated in FIG. 3, the recommendation engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as recommendation engine 300, and includes content module 302, training module 304, compression module 306 and runtime module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
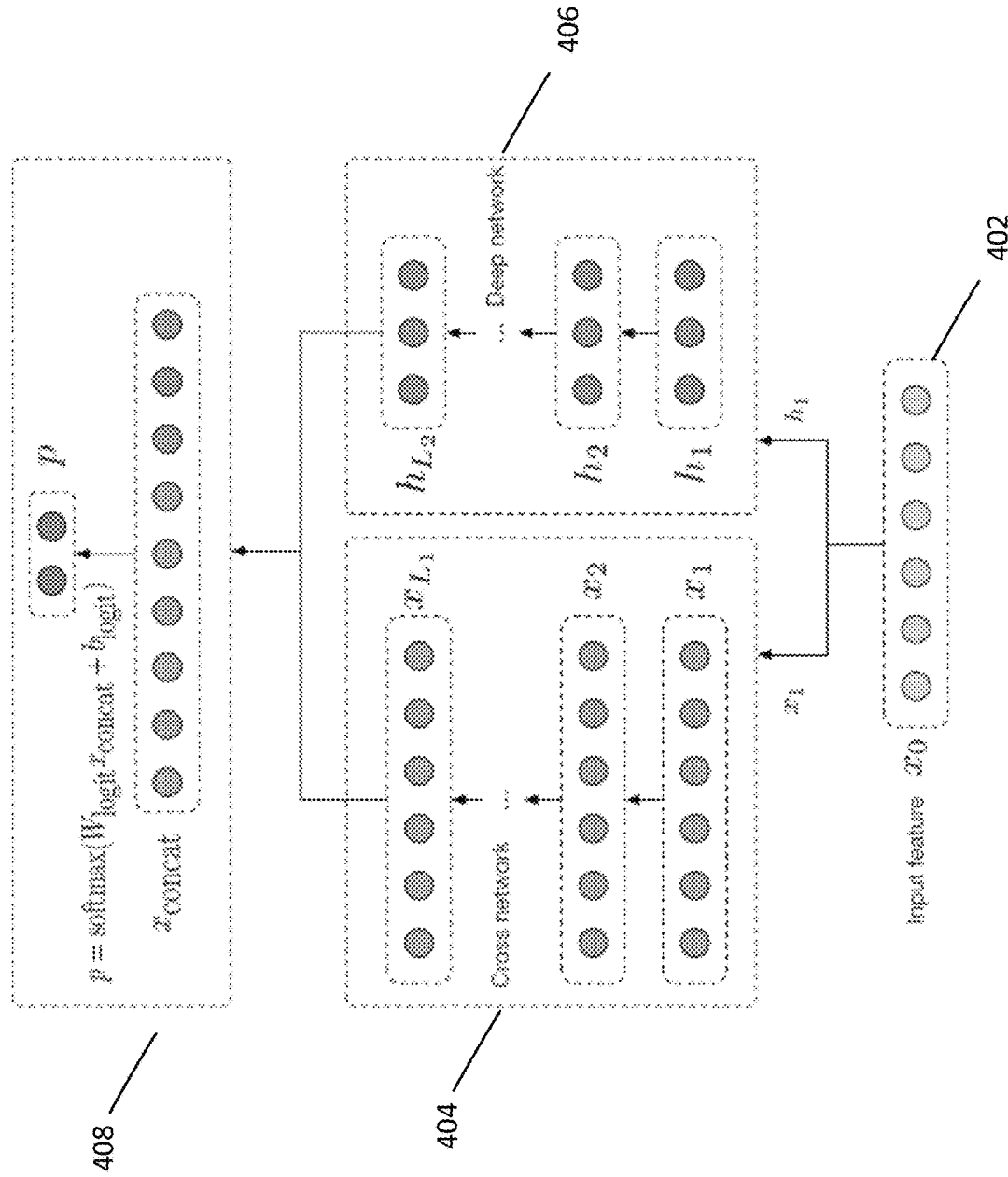
FIG. 4 illustrates an exemplary example of network architecture in accordance with some embodiments of the present disclosure.

FIG. 4 provides a non-limiting example embodiment of the network architecture for the DCN framework 400. FIG. 4 depicts input features 402, cross network model 404, deep network 406 and the DCN model 408.

As discussed herein, and below in relation to FIG. 6, framework 400 receives input features 402, which can be a set of features identified, extracted and/or derived from a content object(s), as discussed below in more detail in relation to FIG. 6 (e.g., 212 hand-crafted features $x_o$). These features 402 are fed into two sub-networks—cross network model 404 and deep network model 406. As discussed below, the cross network 404 learns feature crossings in an efficient manner, while the deep network 406 implicitly learns useful features. The output of these features are then concatenated used to train the DCN model 408, as discussed in more detail below.

Figure 5:
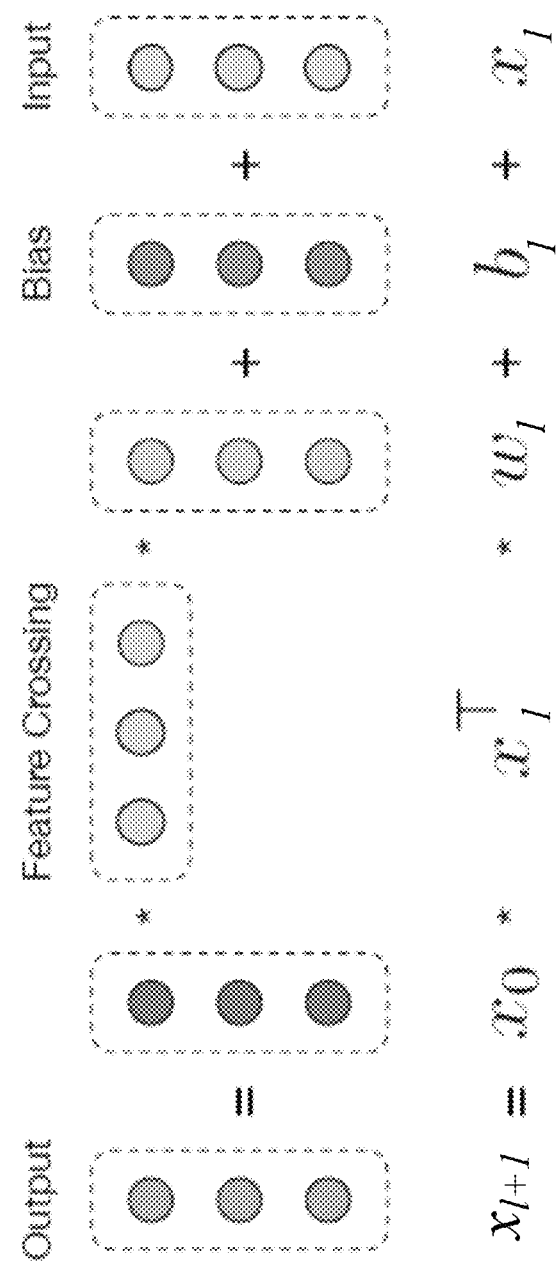
FIG. 5 illustrates an example of a cross layer within the network architecture of FIG. 4 according to some embodiments of the present disclosure.

According to some embodiments, cross network 404 is composed of a plurality of cross layers. An example of a cross layer 500 is depicted in FIG. 5, where the cross layer 500's output, feature cross, bias and input are illustrated as an example embodiment, as discussed herein. According to some embodiments, each cross layer has the following formula:

$$x_{l+1} = x_0 x_l^T w_l + b_l + x_l \qquad (\text{Eq. 1}),$$

$$x_{l+1} = f_c(x_l, w_l, b_l) + x_l \qquad (\text{Eq. 2}),$$

where $x_l$, $x_{l+1} \in R^d$ are column vectors denoting the learned features from the l-th and l+1th cross layers, respectively; $w_l$, $b_l \in R^d$ represent the weights and bias to be learned in layer l. According to some embodiments, the cross network 404 also adds back the original input feature from layer l after applying a cross operation fc, which fits the residual connection of $x_{l+1} - x_l$. In some embodiments, $x_0$ comprises information related to the original feature, and $x_1^T$ comprises information output from a previous cross layer.

According to some embodiments, deep network 406 is configured as a fully-connected feed-forward network, where each deep layers follows the following formula:

$$h_{l+1} = \max(0, W_l h_l + b_l) \qquad (\text{Eq. 3}),$$

$$h_{l+1} = f_d(W_l h_l + b_l) \qquad (\text{Eq. 4}),$$

where $h_l \in R^d$, $h_{l+1} \in R^d$ are hidden layers from the l-th and (l+1)-th layer in the deep network 406. In some embodiments, each layer of deep network 406 can be equipped with neural network overfitting prevention and/or reduction and batch normalization mechanisms (e.g., Dropout, for example) in order to prevent overfitting and to help accelerate optimization. In some embodiments, $f_d$ is a neural network activation function (e.g., Rectified Linear Unit (ReLu), or similar) that can be applied to incorporate non-linearity.

According to some embodiments, the output features from the layers of the cross network 404 and the deep network 406 are concatenated together as $x_{concat}$ by DCN model 408. As discussed in more detail below in relation to FIG. 6, $x_{concat}$ can be fed into a two-way logits layer of the DCN model 408 for training. In some embodiments, a two-way layer is implemented to account for sigmoid loss in binary classification. The two-way layer (e.g., two-way logits, as discussed below) enables the distillation to a smaller network model, as discussed below in relation to FIG. 7. Thus, as discussed herein, and in more detail below in relation to FIGS. 6-7, DCN model produces a trained Teacher network model (or Teacher model or Teacher network, used interchangeably), which can then be distilled and compressed into a lightweight Student network model (or Student model or Student network, used interchangeably) for application to portal production environments.

Figure 6:
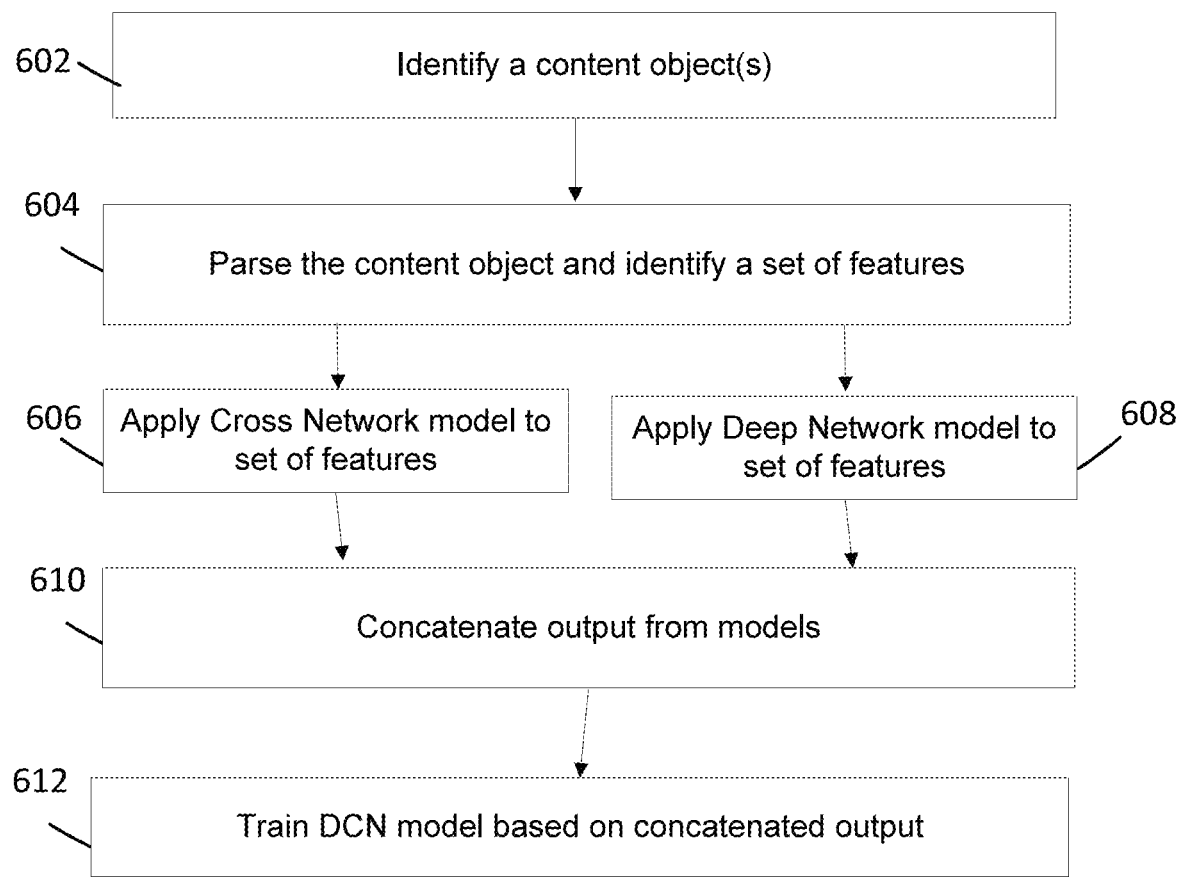
FIG. 6 is a block diagram illustrating an exemplary data flow in accordance with some embodiments of the present disclosure.

Turning to FIG. 6, Process 600 is disclosed which details non-limiting example embodiments for training a DCN model. The training steps of Process 600 correspond to the data flow within the architecture discussed above in relation to FIGS. 4-5. As discussed in more detail below, a trained DCN model (via Process 600) below, can be referred to as a "Teacher" model, which is the full-scale, large trained entity, that will be scaled down to a lightweight, real-time applicable version (called the "Student" model) via at least the steps discussed below in relation to Process 700 of FIG. 7.

According to some embodiments, Steps 602-604 of Process 600 are performed by content module 302 of recommendation engine 300; and Steps 606-610 are performed by training module 304.

Process 600 begins with Step 602 where a content object(s) is identified. While the discussion herein will be based on a single content object, it should not be construed as limiting, as the identified content object can be a plurality of content items, and one of skill in the art would understand that the scope of the instant application would remain unchanged.

According to some embodiments, the content object can be any type of known or to be known content object, media object, or item that points to or references a content/media object, such as, but not limited to, an image, a video, text, a uniform resource locator (URL) to a network location hosting content, a news article, a social media post or webpage, a website, a multimedia object, and the like, or some combination thereof. According to some embodiments, the content object can be any type of digital content that can be visibly displayed and/or rendered on a webpage, user interface (UI), or browser UI. For example, the content object can be a news article that is displayed on a provider's homepage.

In Step 604, the identified content object is analyzed in order to identify features (or characteristics or attributes, used interchangeably) that relate to the content object and/or users interactions therewith. Step 604's analysis involves parsing the content object and identifying and/or extracting information related to a set of features. In some embodiments, the features in the set are handcrafted (HC) features. In some embodiments, the number of features can be predetermined—for example, extract information pertaining to 212 handcrafted features.

In some embodiments, the features can include, but are not limited to, user profile features (e.g., age, gender, and the like); content or document specific features (e.g., content/document age, length, and the like); user and document crossing features; and labels (e.g., whether clicked or skipped).

It should be understood that the features extracted from the content object are not limited to HC features, as any type of known or to be known feature, whether extracted, modified or unmodified, or compiled (e.g., a feature vector) can be utilized without departing from the scope of the instant disclosure.

According to some embodiments, the analysis and feature identification performed in Step 604 can be performed by engine 300 executing any type of known or to be known computational analysis technique, algorithm or artificial intelligence or machine learning mechanism, such as, but not limited to, computer vision, neural networks, data mining, feature extraction, and the like.

Process 600 then proceeds to Steps 606 and 608. In some embodiments, Steps 606 and 608 can be performed in parallel; in some embodiments, they can be performed sequentially, where embodiments exist where some overlap in processing may occur (e.g., begin Step 606, and then begin Step 608 before Step 606 completes, and vice versa).

Turning first to Step 606, engine 300 applies a cross network model to the identified set of features. The functionality, application and result of such cross network modeling is discussed above in relation to the cross network 404 and cross network layer 500 of FIGS. 4 and 5, respectively. The result of Step 606 is engine 300 determining a cross network model output.

Turning to Step 608, engine 300 applies a deep network model to the identified set of features. The functionality, application and result of such deep network modeling is discussed above in relation to the deep network 406 of FIG. 4. The result of Step 608 is engine 300 determining a deep network model output.

In Step 610, the outputs of Steps 606 and 608 are concatenated as $x_{concat}$, as discussed above in relation to FIG. 4. In Step 612, the DCN model is trained based on $x_{concat}$. In some embodiments, in Step 612, $x_{concat}$ can be fed into a two-way logits layer for training. As discussed above, the two-way logits enables the distillation of the full or "heavy" DCN/Teacher model into a smaller "Student" model, as detailed in relation to Process 700 below. This enables the Student model (e.g., smaller version of the large DCN/Teacher model) to scale to a dynamic network environment and be configured as a size that is compatible with live production requirements.

According to some embodiments, the training in Step 612 is based on the following loss function, which can be a log loss (cross entropy loss) on top of a predicted probability from DCN and ground truth labels (e.g., click or skip):

$$\text{loss} = -\frac{1}{N}\sum_{i=1}^{N}[\mathbb{1}(y_i = 0)\log p_{i,0} + \mathbb{1}(y_i = 1)\log p_{i,1}], \quad \text{(Eq. 5)}$$

where $p_i$ (as discussed above and depicted in FIG. 4, where $p=\text{softmax}(W_{logit}X_{concat}+b_{logit})$ contains probabilities of both skip and click actions for one example i, $y_i$ denotes the ground truth label, N is the total size of training dataset, and $\mathbb{1}(\cdot)$ is an indicator function returning 1 when the input condition is satisfied. According to some embodiments, label smoothing may be disabled during the initial model training (e.g., Teacher model training) so that the compressed model (e.g., Student model), discussed in relation to Process 700 of FIG. 7, can be more accurately and efficiently generalized.

Figure 7:
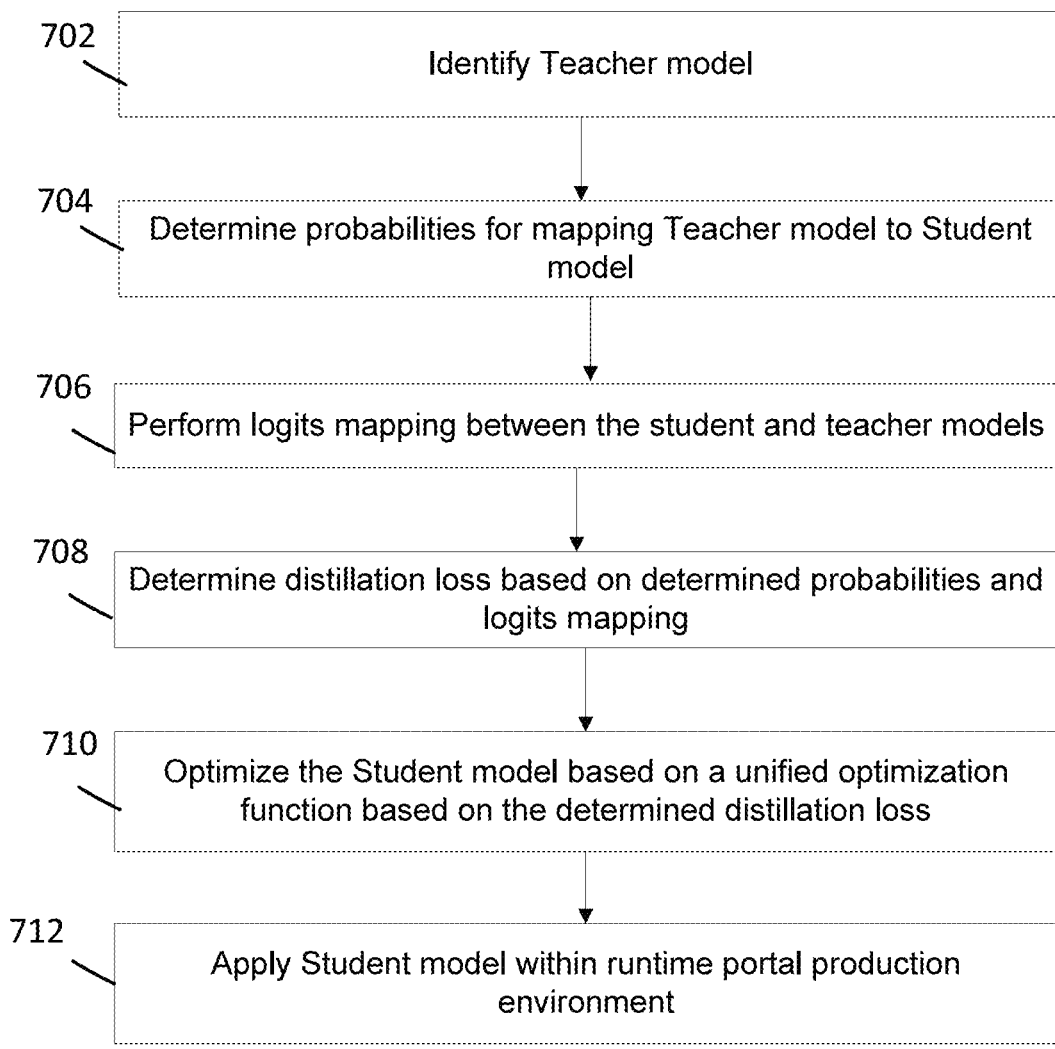
FIG. 7 is a block diagram illustrating an exemplary data flow in accordance with some embodiments of the present disclosure.

Turning to FIG. 7, Process 700 is disclosed which details the operations for scaling the trained Teacher model to a compressed, distilled version of itself, referred to as the Student model.

According to some embodiments, once the Teacher model is trained (Process 600, discussed above), Process 700 embodies the computerized mechanisms for ensuring that the smaller size, compressed Student model maintains a maximum average log of probability that the correct, or same result as the Teacher model is produced, regardless of different classes or categories of content and/or production requirements.

According to some embodiments, Steps 702-710 of Process 700 are performed by compression module 306 of recommendation engine 300; and Step 712 is performed by runtime module 308.

Process 700 begins with Step 702 where a Teacher model is identified. An example of this is the trained DCN model discussed above in relation to FIG. 6.

In Step 704, probabilities are determined for mapping the Teacher model to a Student model. According to some embodiments, probabilities can be determined by neural networks through a "softmax" function, which converts the logit $s_i$ into a probability $q_i$ by comparing $s_i$ with other logits:

$$q_i = \frac{e^{s_i/T}}{\sum_{j=1}^{K} e^{s_j/T}}, \quad \text{(Eq. 6)}$$

where T is a hyper-parameter called temperature and K is a total number of classes. In some embodiments, higher value of T produce a softer probability distribution over classes, thereby easing learning of relativity among classes. Thus, in some embodiments, the distillation loss can be constructed with the cross entropy loss between the probability distribution q of a Student network and the one p from an already trained teacher network:

$$L_{distill} = -\frac{1}{N}\sum_{i=1}^{N}\sum_{k=1}^{K} p_{i,k}^T \log q_{i,k}^T. \quad \text{(Eq. 7)}$$

According to some embodiments, the distributions of q and p can be determined and produced with the same temperature T>1 to ensure that the result distributions are soft enough. In some embodiments, criteria or conditions can be implemented that enable improved performance by training along with a typical cross entropy loss, in which T in the Student network is set to 1, and the actual ground truth label is used instead of the probability p from the teacher network. For example, this can be represented as follows:

$$L_{XE} = -\frac{1}{N}\sum_{j=1}^{N}\sum_{k=1}^{K} \mathbb{1}(y_i = k) \log q_{i,k}^1. \quad \text{(Eq. 8)}$$

In Step 706, engine 300 performs logits mapping between the Student and Teacher models. According to some embodiments, the Student network's logits $s_i$ is mapped to be as similar as possible as the teacher network's logits $t_i$. In some embodiments, such mapping is performed using the mean square error, as follows:

$$L_{MSE} = \frac{1}{NK}\sum_{i=1}^{N}\sum_{k=1}^{K} (t_{i,k} - s_{i,k})^2. \quad \text{(Eq. 9)}$$

In Step 708, engine 300 determines a distillation loss based on the determined probabilities ($L_{XE}$ from Step 704) and the logits mapping ($L_{MSE}$ from Step 706). In some embodiments, $L_{XE}$ and $L_{MSE}$ are combined together with the original distillation loss so that its resulting combination can be used for optimization. In some embodiments, two-hyper parameters $\alpha$ and $\beta$ can be utilized to balance the relative importance of $L_{XE}$ and $L_{MSE}$. For example, the final loss can be realized as:

$$L = L_{distill} + \alpha L_{XE} + \beta L_{MSE} \quad \text{(Eq. 10)}.$$

In some embodiments, $\alpha$ and $\beta$ can be weighted, or set, at relatively low values to ensure the balance of $L_{XE}$ and $L_{MSE}$ and to ensure generality is maintained during the compression from the Teacher model's network to the Student model's network. In some embodiments, T, $\alpha$ and $\beta$ can be set to particular values—for example: T=2, $\alpha$=0.5 and $\beta$=0.5.

In Step 710, the Student model is optimized based on a unified optimization loss function (Eq. 10). In some embodiments, Eq. 10 results in a unified optimization function, which enables customization of preferences to different targets for the Student network. In some embodiments, the targets can be, but are not limited to, types of content objects, categories or classes of content, time periods, types or identities of users, webpage/website upon which the recommendation will be hosted/displayed, and the like, or some combination thereof.

Thus, as a result of Step 710, the Student model is compiled (or generated from the Teacher model), which is a lightweight version of the trained Teacher model, and is ready for application to a runtime environment, which as discussed above, can be a live (e.g., real-time network traffic) and/or offline portal production environment. Therefore, in Step 712, the Student model can be applied and produce a ranked stream of content objects for a user.

In some embodiments, Step 712 involves the reception of a request for a web page from a user, whereby the Student model is called to execute based on identified information of the user. The Student model analyzes the request, and produces a ranked set of content recommendations for the user that is displayed on the web page.

For example, as a user visits a Yahoo! ® Homepage, the Student model can be deployed and/or executed to provide content recommendations. In some embodiments, the entire homepage experience can be a product of the Student model's recommendations (e.g., all of the content objects displayed on the page are recommended as a result of Student model's execution); and in some embodiments, a portion or section of the Homepage can display the recommended content objects.

FIG. 8 is a work flow process 800 for serving or providing related digital media content based on the information associated with a recommendation, as discussed above in relation to FIGS. 4-7. For example, providing related digital content to a ranked stream of content items displayed on a portal homepage. In some embodiments, the provided content can be associated with or comprising advertisements (e.g., digital advertisement content). Such information can be referred to as "content object information" for reference purposes only.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 802, content object information is identified. This information can be derived, determined, based on or otherwise identified from the steps of Processes 600-700, as discussed above. For example, a content objects(s) can refer to a recommended stream of ranked items that are to be displayed on a portal webpage.

For purposes of this disclosure, Process 800 will refer to a single recommended content object; however, it should not be construed as limiting, as any number of content objects (within a recommendation) within a webpage, and/or recommendations, can form such basis, without departing from the scope of the present disclosure.

In Step 804, a context is determined based on the identified content object information. This context forms a basis for serving content related to the content information. For example, if a content object relates to a news article about a baseball game, then the context can be determined to be about baseball, the teams playing in the game, or players involved in the game, or some combination thereof.

In some embodiments, the identification of the context from Step 804 can occur before, during and/or after the analysis detailed above with respect to FIGS. 6-7, or it can be a separate process altogether, or some combination thereof. In some embodiments, the identification of the context from step 804 can be based on a user visiting a page and recommended content objects being provided therein.

In Step 806, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 808, the server searches the database for a digital content item(s) that matches the identified context. In Step 810, a content item is selected (or retrieved) based on the results of Step 808.

In some embodiments, the selected content item can be modified to conform to attributes or capabilities of a device, browser user interface (UI), video, page, interface, platform, application or method upon which a user will be viewing the recommendations. In some embodiments, the selected content item is shared or communicated via the application or browser the user is utilizing to consume a webpage. Step 812. In some embodiments, the selected content item is sent directly to a user computing device for display on a device and/or within a user interface (UI) displayed on the device's display (e.g., within the browser window and/or within an inbox of a high-security property). In some embodiments, the selected content item is displayed within a portion of the interface or within an overlaying or pop-up interface associated with a rendering interface displayed on the device.

In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, by a device, a set of content objects;
   analyzing, by the device, the set of content objects, and based on the analysis, determining a set of features;
   analyzing, by the device executing a cross network model, the set of features, and determining a cross network model output;
   analyzing, by the device executing a deep network model, the set of features, and determining a deep network model output;
   concatenating, by the device, the cross network model output and the deep network model output;
   training, by the device, a Teacher model based on the concatenation, the Teacher model being a full-scale version of a Deep & Cross Network (DCN) model; and
   applying, by the device, a unified optimization loss function that combines probability distribution mapping and logits mapping to compress the Teacher model to a Student model, the Student model being a lightweight version of the Teacher model having a model size optimized for deployment within a live runtime environment to rank a stream of new content objects, wherein the live runtime environment requires ranking responses within a specified latency requirement for incoming user requests.

2. The method of claim 1, further comprising:
determining a probability distribution based on execution of a neural network softmax function;
determining a mapping between the Teacher model to the Student model based on the probability distribution;
identifying a set of logits for the Teacher model;
mapping, based on a mean square error calculation, the set of logits of the Teacher model to a set of logits for the Student model; and
determining, based on the logits mapping and the probability distribution mapping, a distillation loss, wherein the compression of the Teacher model to the Student model is based on distillation loss.

3. The method of claim 2, wherein the probability distribution is for a class of content.

4. The method of claim 2, further comprising:
weighting values of the logits mapping and the probability distribution mapping, wherein the determined distillation loss is based on the weighted values.

5. The method of claim 1, wherein the cross network model comprises a plurality of layers associated with learned features.

6. The method of claim 1, wherein the deep network model comprises a plurality of layers comprising functionality for performing neural network overfitting prevention or reduction and batch normalizations.

7. The method of claim 1, wherein the training is based on a two-way logits of the DCN model.

8. The method of claim 1, wherein the set of features comprise hand-crafted features.

9. The method of claim 1, further comprising:
receiving a request for a web page, wherein the live runtime environment corresponds to request;
executing, based on the request, the Student model, and generating a set of content recommendations, the content recommendations being a ranked set of content objects; and
providing the set of content recommendations on the web page.

10. The method of claim 9, further comprising:
requesting, over the network, third party digital content based at least on information related to the set of content recommendations;
receiving, over the network, the third party digital content; and
communicating, over the network, the third party digital content for display on the web page along with the set of content recommendations.

11. A non-transitory computer-readable storage medium tangibly encoded with computer-executable instructions, that when executed by a processor associated with a device, performs a method comprising:
identifying, by the device, a set of content objects;
analyzing, by the device, the set of content objects, and based on the analysis, determining a set of features;
analyzing, by the device executing a cross network model, the set of features, and determining a cross network model output;
analyzing, by the device executing a deep network model, the set of features, and determining a deep network model output;
concatenating, by the device, the cross network model output and the deep network model output;
training, by the device, a Teacher model based on the concatenation, the Teacher model being a full-scale version of a Deep & Cross Network (DCN) model; and
applying, by the device, a unified optimization loss function that combines probability distribution mapping and logits mapping to compress the Teacher model to a Student model, the Student model being a lightweight version of the Teacher model having a model size optimized for deployment within a live runtime environment to rank a steam of new content objects to rank a stream of new content objects, wherein the live runtime environment requires ranking responses within a specified latency requirement for incoming user requests.

12. The non-transitory computer-readable storage medium of claim 11, further comprising:
determining a probability distribution based on execution of a neural network softmax function;
determining a mapping between the Teacher model to the Student model based on the probability distribution;
identifying a set of logits for the Teacher model;
mapping, based on a mean square error calculation, the set of logits of the Teacher model to a set of logits for the Student model; and
determining, based on the logits mapping and the probability distribution mapping, a distillation loss, wherein the compression of the Teacher model to the Student model is based on distillation loss.

13. The non-transitory computer-readable storage medium of claim 12, wherein the probability distribution is for a class of content.

14. The non-transitory computer-readable storage medium of claim 12, further comprising:
weighting values of the logits mapping and the probability distribution mapping, wherein the determined distillation loss is based on the weighted values.

15. The non-transitory computer-readable storage medium of claim 11, wherein the cross network model comprises a plurality of layers associated with learned features, wherein the deep network model comprises a plurality of layers comprising functionality for performing neural network overfitting prevention or reduction and batch normalizations.

16. The non-transitory computer-readable storage medium of claim 11, wherein the training is based on a two-way logits of the DCN model.

17. The non-transitory computer-readable storage medium of claim 11, further comprising:
receiving a request for a web page, wherein the live runtime environment corresponds to request;
executing, based on the request, the Student model, and generating a set of content recommendations, the content recommendations being a ranked set of content objects; and
providing the set of content recommendations on the web page.

18. A computing device comprising:
a processor configured to:
identify a set of content objects;
analyze the set of content objects, and based on the analysis, determine a set of features;
analyze, by executing a cross network model, the set of features, and determine a cross network model output;
analyze, executing a deep network model, the set of features, and determine a deep network model output;

concatenate the cross network model output and the deep network model output;

train a Teacher model based on the concatenation, the Teacher model being a full-scale version of a Deep & Cross Network (DCN) model; and apply a unified optimization loss function that combines probability distribution mapping and logits mapping to compress the Teacher model to a Student model, the Student model being a lightweight version of the Teacher model having a model size optimized for deployment within a live runtime environment to rank a steam of new content objects to rank a stream of new content objects, wherein the live runtime environment requires ranking responses within a specified latency requirement for incoming user requests.

19. The computing device of claim 18, further comprising:

determine a probability distribution based on execution of a neural network softmax function;

determine a mapping between the Teacher model to the Student model based on the probability distribution;

identify a set of logits for the Teacher model;

map, based on a mean square error calculation, the set of logits of the Teacher model to a set of logits for the Student model; and determine, based on the logits mapping and the probability distribution mapping, a distillation loss, wherein the compression of the Teacher model to the Student model is based on distillation loss.

20. The computing device of claim 18, further comprising:

receive a request for a web page, wherein the live runtime environment corresponds to request;

execute, based on the request, the Student model, and generate a set of content recommendations, the content recommendations being a ranked set of content objects; and provide the set of content recommendations on the web page.

\* \* \* \* \*